United States Patent [19]

Pearce

[11] Patent Number: 5,548,280
[45] Date of Patent: Aug. 20, 1996

[54] LOCAL AREA NETWORK HUB UNIT

[75] Inventor: David Pearce, High Wycombe, United Kingdom

[73] Assignee: Madge Networks Limited, Bucks, United Kingdom

[21] Appl. No.: 241,416

[22] Filed: May 11, 1994

[30]     Foreign Application Priority Data

May 12, 1993 [GB]  United Kingdom ............... 9309786

[51] Int. Cl.⁶ ........................................................ H04Q 1/00
[52] U.S. Cl. ................................. 340/825.050; 370/85.15
[58] Field of Search ...................... 340/825.05, 825.52; 370/85.5, 85.15; 439/638, 639; 379/441, 443

[56]                References Cited

U.S. PATENT DOCUMENTS

| 4,847,611 | 7/1989 | Bekki et al. ...................... 340/825.05 |
| 4,868,863 | 9/1989 | Hartley et al. ......................... 379/441 |
| 4,905,230 | 2/1990 | Madge et al. ......................... 370/85.5 |
| 4,909,757 | 3/1990 | Reed . | |
| 5,340,333 | 8/1994 | Schroth ................................ 439/638 |

FOREIGN PATENT DOCUMENTS 9002958  6/1990  Germany .

OTHER PUBLICATIONS

Crayford, Ian, "10base–T in the Office," *IRE Wescon Convention Record*, vol. 35, Nov. 1991, pp. 232–237.

*Primary Examiner*—Brian Zimmerman
*Attorney, Agent, or Firm*—Sughrue, Mion, Zinn, Macpeak & Seas

[57]                ABSTRACT

A local area network hub unit (5) has a plurality of switch units (16,17) connected in a ring. Each switch unit (16,17) may be connected to either an adjacent switch unit or to a group of pins of a connector unit (42). Each group of pins of the connector unit may be connected to respective end stations (8,9). Selected groups of two or more switch units (16,17) are connected to a common connector unit (42). Each group of pins of a connector unit (42) maybe coupled by a common coupling unit (7) to their respective end stations.

7 Claims, 2 Drawing Sheets 5,548,280

LOCAL AREA NETWORK HUB UNIT

FIELD OF THE INVENTION

This invention relates to a local area network hub unit.

DESCRIPTION OF THE PRIOR ART

It is common practice to provide a cabling scheme for various types of communications network, which allows standard connectors to be used for any type of data communications network. For example, buildings can be wired up without restricting the particular type of communications network to be used.

Examples of such communications networks include token ring, Ethernet, and FDDI on copper. A conventional standard which can be used by all these systems is to provide RJ45 8-pin phone connectors and specify 8-core cable for the communication network. This is required by several National and International standards.

A problem in installation of communications networks is that there is pressure on space available and it is desirable to make efficient use of all components within the network, and avoid unnecessary expenditure.

SUMMARY OF THE INVENTION

In accordance with a first aspect of the present invention, a local area network hub unit comprises a plurality of switch units connected in a ring; each switch unit being connectable to an adjacent switch unit or to a group of pins of a connector unit and each group of pins of the connector unit being connectable to a respective end station; wherein at least one group of two or more switch units is connected to a common connector unit.

In many cases no modification of the connector units in a conventional hub unit needs to be made. This is due to the fact that ports of such connector units usually have redundant connecting pins with which the invention can be utilised.

Typically, each group of pins comprises four pins.

In one example, the hub unit comprises five connector units.

In accordance with a second aspect of the present invention, a local area network comprises a local area network hub unit according to the first aspect of the invention and a number of end stations connected to the hub unit by respective groups of pins.

For convenience, preferably each group of pins of a connector unit is coupled by a common coupling unit to a respective end station.

The present invention makes more efficient use of the space available to provide connections to a hub for end stations requiring fewer components. More than one end station may be connected to the hub unit using a single connector unit. This reduces the amount of cable required.

Preferably, the common coupling unit comprises a plug for connection to the local area network hub unit and a pair of sockets for connection with cables from each of a pair of end stations wherein the plug and sockets are moulded as an integral unit.

This also reduces the number of individual components used to further reduce expense and use of space.

Typically, the cable is shielded or unshielded twisted pair cable.

BRIEF DESCRIPTION OF THE DRAWINGS

An example of a local area network hub unit and a local area network in accordance with the present invention will now be described and contrasted with a conventional network with reference to the accompanying drawings, in which.

DETAILED DESCRIPTION OF THE EMBODIMENT

Figure 1:
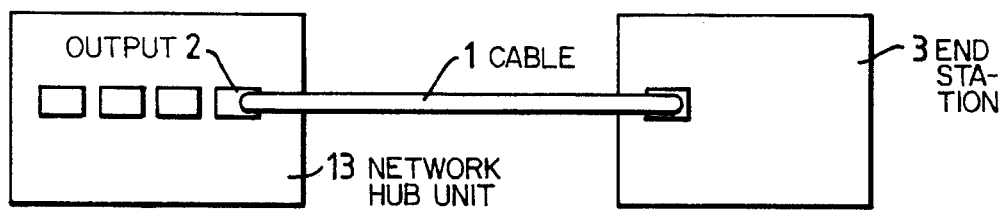
FIG. 1 shows a conventional network.

FIG. 1 shows a conventional network. A cable 1, typically 8-core unshielded, twisted pair cable, is used to connect between an output 2 of a local area network hub unit 13 and an end station 3. The output from the network hub unit 13 to the end station 3 is provided via an RJ45 connector 2 having 8 cable cores. For token ring, Ethernet or FDDI operation, only four of these cable cores will be used to transmit and receive between the end station 3 and the network hub unit 13. The other four cable cores are redundant. Other networks may use only 3 cable cores in total. This is wasteful of both space and materials.

A typical arrangement for token ring is to use pins 3 and 6 to transmit signals and 4 and 5 to receive signals with 1 and 2; 7 and 8, unused. For Ethernet pins 1 and 2 are used for receive and pins 3 and 6 for transmit in accordance with the IEEE standard 802.3. For FDDI on copper cable, typically pins 1 and 2, 7 and 8 are used. The pairs of cable cores connected to the pairs of pins are twisted together.

Figure 2:
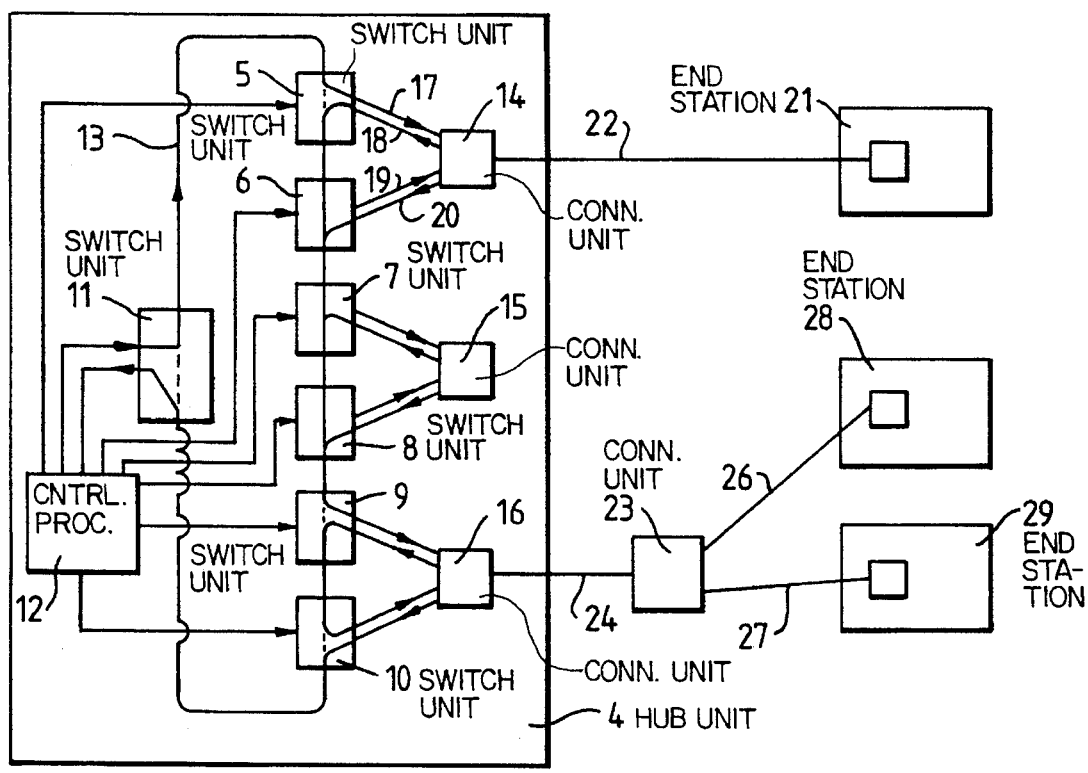
FIG. 2 shows an example of a local area network incorporating a hub unit in accordance with the invention.

FIG. 2 illustrates a token ring local area network including a hub unit 4 containing a set of six switch units 5–10 of conventional form linked in series in a data transmission ring with a switch unit 11 connected to an end station and control processor 12. Data flows around path 13 in the direction indicated by the arrows through the switch units 5–10 to be described in more detail below and via the switch unit 11 to the end station and control processor 12 and back to the switch unit 11. Each switch unit 5–11 is switchable between a bypass state in which data passes straight through the switch unit onto the next switch unit and a switch state in which the data is switched to a connector unit. In this example, there are three connector units 14,15,16. The connector unit 14 is connected to the switch units 5,6; the connector unit 15 is connected to the switch units 7,8; and the connector unit 16 is connected to the switch units 9,10. The switch units 7,8 are in their bypass state while the switch units 5,6,9 and 10 and the switch unit 11 are in their switched state. For example, data arriving at the switch unit 5 will pass to the connector unit 14 and return via the switch unit 5 and be passed on to the switch unit 6.

Figure 4:
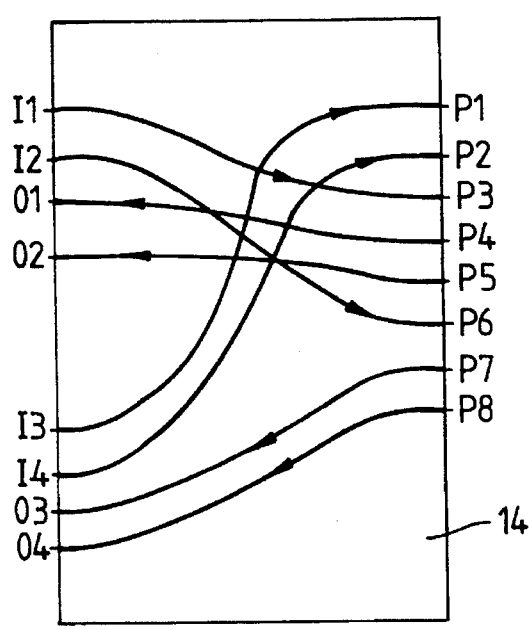
FIG. 4 illustrates a connector unit in more detail.

Each of the connector units 14–16 has a form similar to that shown in FIG. 4. Thus, on the output side, a port comprising a set of eight pins P1–P8 is provided as in a conventional hub unit. The pins P3,P6 receive signals from the switch unit 5 supplied by a line 17 from the switch unit 5 to input pins I1,I2. Pins P4,P5 receive signals from an end station and these are passed to output pins O1,O2 connected by a line 18 to the output side of the switch unit 5. In contrast to conventional hub units, however, the pins P1,P2,P7,P8 of the port are also utilised. In this example, input signals from the switch unit 6 on a line 19 are received by input pins I3,I4 and are passed to pins P1,P2 while signals from the pins P7,P8 are passed to output pins O3,O4 respectively which in turn are connected via a line 20 to the output side of the switch unit 6.

In the example shown in FIG. 2, a single end station 21 is connected to the connector unit 14. A conventional eight-core unshielded, twisted pair cable 22 is used with the cores being connected to pins P1–P8 respectively. No end stations are connected to the connector unit 15.

Figure 3:
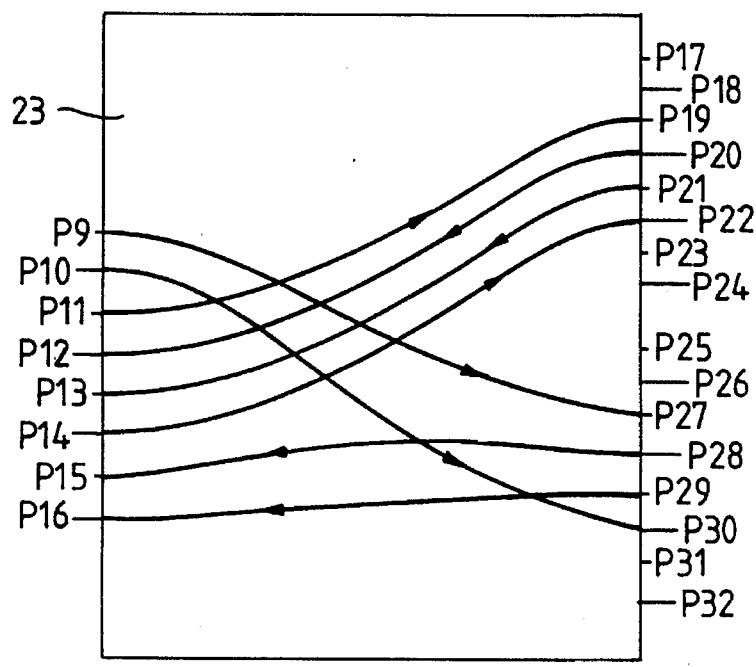
FIG. 3 shows a coupling unit of FIG. 2 in more detail.

A coupling unit 23 is connected to the connector unit 16 via eight-core cable 24, the coupling unit 23 being shown in more detail in FIG. 3. As can be seen in FIG. 3, the coupling unit 23 has a housing 25 on one side of which is provided a port of eight pins P9–P16 and these pins are connected in groups of four to respective groups of pins on the opposite side of the coupling unit housing 25. Thus, the connections are as follows.

P9–P27
P10–P30
P11–P19
P12–P20
P13–P21
P14–P22
P15–P28
P16–P29.

The pins P17–P24 and P25–P32 define a pair of ports into which are plugged conventional eight-core cables 26,27 connected to respective end stations 28,29. It will be noted that as far as the cables 26,27 are concerned, they carry data in a conventional manner on the cores connected to pins P19–P22 and P27–P30 respectively.

In operation, once the end stations 21,28,29 have been connected in the manner shown, the processor 12 will configure the ring in a conventional manner. In particular, the processor 12 will transmit frames around the ring and separately cause the switch units 5–10 to switch to their switched positions and determine whether or not an end station is connected to the respective group of pins. For example, in the case of the switch unit 9, in the position shown in FIG. 2, a frame will be diverted to the connector unit 16 and the pins I1,I2, be transmitted to pins P3,P6 and from there onto pins P11,P14 of the connector unit 23. This will convey the frame to pins P19,P22 and from there along the cable 26 to the end station 28 which will respond to the arrival of the frame by providing an indication of its existence and then send the resulting frame back to pins P20,P21 of the coupling unit 23. From there the return frame passes to pins P11,P12 and from there along the cable 24 back to pins P4,P5 of the connector unit 16. The frame then passes to the switch unit 9 from where it is output to the switch unit 10 and thereafter back to the switch unit 11 and the processor 12. This will indicate to the processor 12 that the end station 28 is present and the switch unit 9 should be switched to its switched position in use. The process is repeated with the switch unit 10 and in a similar way the processor 12 will determine the presence of the end station 29. Eventually, the processor 12 will detect the presence of all three end stations and thus cause the switch units 5,9 and 10 to be switched to their switched positions as shown in FIG. 2, following which data transmission can begin.

The coupling unit 23 can take a variety of forms and in particular it is not essential for it to be positioned remotely from the connector units 14–16. Instead, the pins P9–P16 could be formed as an integral plug which is connected directly into a socket defined by the pins P1–P8 of the connector unit.

The term "pin" should be understood to mean any form of connection (for example socket or spigot).

I claim:

1. A local area network hub unit comprising a plurality of switch units connected in a ring; each switch unit being selectively connectable either to an adjacent switch unit or to a group of pins of a connector unit and each group of pins of the connector unit being connectable to a respective end station; wherein at least one group of two or more switch units is connected to a common connector unit, each switch unit of said group of switch units being connectable to a respective group of pins of said common connector unit, wherein end stations are connected to respective groups of pins of said common connector unit to communicate simultaneously and independently with the hub unit.

2. A local area network unit according to claim 1, wherein each group of pins comprises four pins.

3. A local area network unit according to claim 1, comprising five connector units.

4. A local area network comprising a local area network hub unit including a plurality of switch units connected in a ring; each switch unit being selectively connectable either to an adjacent switch unit or to a group of pins of a connector unit and each group of pins of the connector unit being connectable to a respective end station; wherein at least one group of two or more switch units is connected to a common connector unit, each switch unit of said group of two or more switch units being connectable to a respective group of pins of said common connector unit; and a pair of end stations connected to the hub unit by respective groups of pins of said common connector unit, so as to enable said end stations to communicate simultaneously and independently with the hub unit.

5. A network according to claim 4, wherein each group of pins of a connector unit is coupled by a common coupling unit to a respective end station.

6. A network according to claim 5, wherein the common coupling unit comprises a plug for connection to the local area network hub unit and a pair of sockets for connection with cables from each of a pair of end stations wherein the plug and sockets are moulded as an integral unit.

7. A network according claim 6, wherein the cable is shielded or unshielded twisted wire cable.

* * * * *